United States Patent

[11] 3,574,872

[72] Inventor Paul G. Mattila
 Rte. 1, Box 543A, Battleground, Wash. 98604
[21] Appl. No. 789,169
[22] Filed Jan. 6, 1969
[45] Patented Apr. 13, 1971

[54] INFANT'S CAR BED
 2 Claims, 5 Drawing Figs.
[52] U.S. Cl. .................................................. 5/94, 5/99, 5/118
[51] Int. Cl. .................................................. A47d 7/00, A47d 9/00
[50] Field of Search ........................................... 5/82, 94, 98, 99, 118

[56] References Cited
UNITED STATES PATENTS

| | | | |
|---|---|---|---|
| 2,853,718 | 9/1958 | Lim................................ | 5/94 |
| 2,805,704 | 9/1958 | Auseev......................... | 5/94X |
| 3,336,060 | 8/1957 | Bradford..................... | 5/82X |
| 3,436,770 | 4/1969 | Turner.......................... | 5/94 |

*Primary Examiner*—Casmir A. Nunberg
*Attorney*—James D. Givnan, Jr.

ABSTRACT: A car bed is disclosed having a rectangular lightweight framework with extensible seat engaging means projecting from each of its corners. Front, rear and bottom walls are of semirigid material hingedly interconnected at their coterminous ends with the front and rear walls being additionally attached to said framework in a hinged manner whereby said walls may be upwardly collapsed against the framework. Yieldable sidewalls permit such collapsing.

Patented April 13, 1971
3,574,872
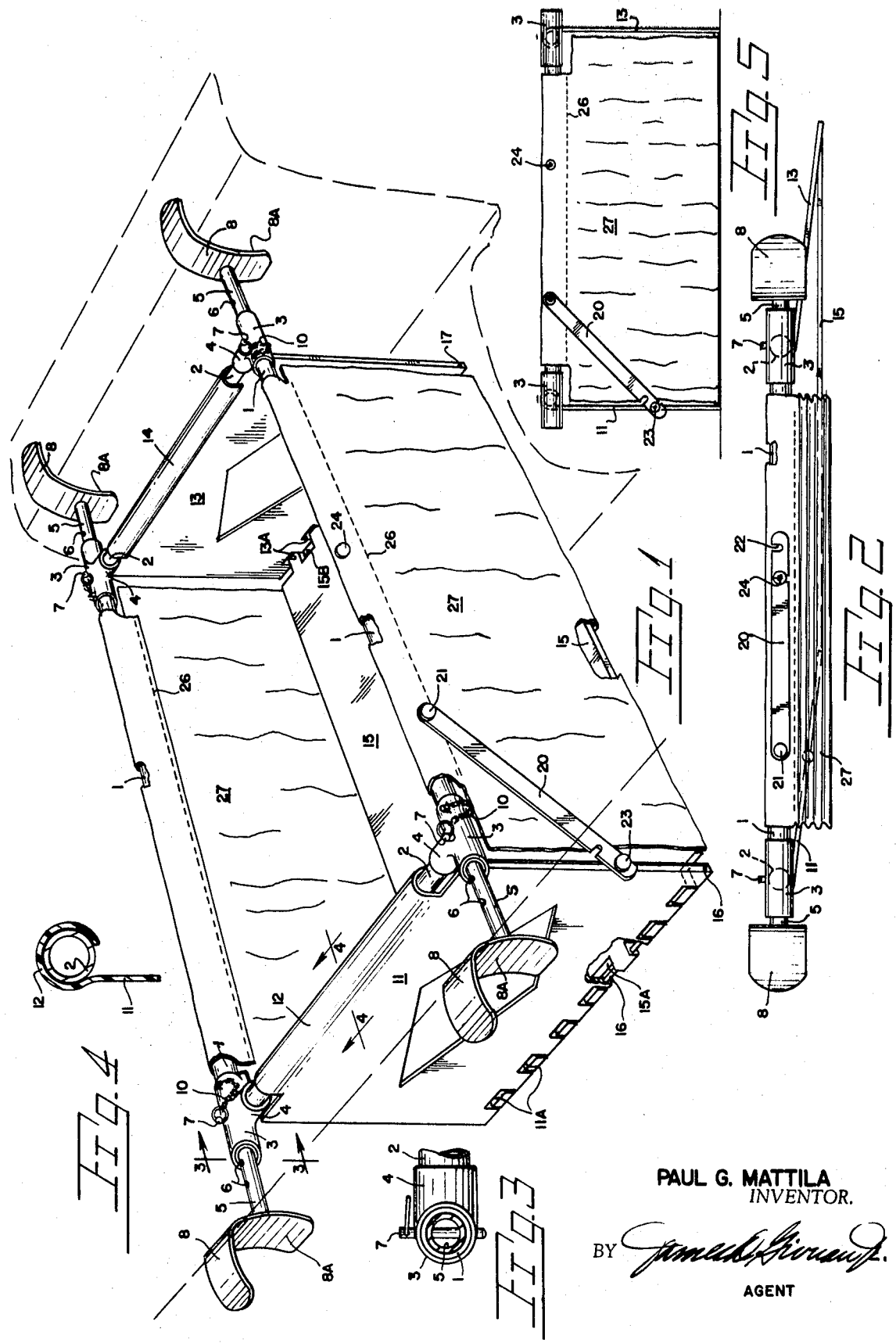
PAUL G. MATTILA
*INVENTOR.*
BY
AGENT 3,574,872

INFANT'S CAR BED

BACKGROUND OF THE INVENTION

The present invention relates generally to car beds for infants and small children and more specifically to such a bed having further use as a bed other than when disposed within an automobile.

The prior art discloses numerous types of infant car beds predominantly embodying frames of formed metal with the bed itself being of cloth stitched about and suspended from the framework. A number of these types of beds convert to a children's automobile seat and are useable other than within the automobile. The car beds shown in the prior art further include a pair of seat-engaging hangers disposed at one end of the car bed with the opposite bed end being supported by a car seat or legs.

The present car bed includes a substantial departure from the foregoing in that a rigid framework is provided with extensible seat-engaging pads for firm and secure abutment against the car seats or seat and dashboard. The obvious advantage of such secure attachment is the unliklihood of bed dislodgement upon emergency stops or even collisions where the seats remain entact within the car body.

A further advantage is the convenience with which the present bed may be operatively disposed within the automobile, a task often as not performed by the mother. The prior art beds are notoriously complex by reason of the several adjustable features therein provided and by the fact that the framework includes a central pivot permitting conversion of the bed to a child's seat.

Utilized in the present car bed is a rigid framework carrying at its corners four telescoping support rods. All adjustments are from the top side accordingly no intricate mechanical operations involving unseen threaded fasteners or fitting of leg ends into pairs of corresponding openings is required of the installer of the car bed.

The present bed is collapsible upon removal of a sway brace and with the partial rotation of the seat-engaging pads further reducing the collapsed size. Importantly, the sway brace serves to retain the bed in operative configuration to permit use of the bed on any flat, level surface within the home thus the tedious adjustments required of the prior art beds are avoided.

SUMMARY OF THE INVENTION

A car bed is provided having a rigid rectangular framework having extensible means at the ends thereof for supported engagement with the automobile. The front and rear walls of the bed are hingedly supported by the framework and are collapsible thereagainst for storage. Convenient adjustment means are visible at all times for placement and locking of the seat engaging part of the bed firmly in place against the seat. A sway brace locks the front, rear, and bottom walls in perpendicular relationship to permit use of the car bed when disassociated from the automobile seats.

BRIEF DESCRIPTION OF THE DRAWING

In the accompanying drawing:

FIG. 1 is a perspective view of the present car bed operatively disposed within an automobile;

FIG. 2 is a side elevational view of the present car bed collapsed for storage;

FIG. 3 is a sectional view taken along line 3-3 of FIG. 1 showing a typical T-fitting and lock of the invention;

FIG. 4 is a sectional view taken along line 4-4 of FIG. 1 and showing the hinged connection between the front wall and framework member; and FIG. 5 is a side elevational view showing the bed operatively disposed on a flat surface with the seat engaging means removed.

DESCRIPTION OF PREFERRED EMBODIMENT

With continuing reference to the drawing wherein like numerals indicate parts similarly identified in the following specification the reference numeral 1 throughout identifies tubular side members of the car bed while like end members are indicated at 2.

Firmly securing said members at their adjacent ends are T-fittings 3, the ends of the side members extending through the length of the T while the tubular end members 2 terminate in sockets 4 of the fittings. The T-fittings preferably include, in a conventional manner, means such as set screws (not shown) to permanently secure the framework in rigid, rectangular form.

Slidably housed in a snug manner within the end portion of the side members 1 are tubular support rods 5 each having a series of adjustment holes as at 6. With reference to FIG. 3, a locking pin 7 is shown insertable through aligned openings in the T-fitting, side member 1 and holes 6 of its associated tubular support rod 5. The rod 5 is accordingly adjustably carried and extensible from the T-fitting for the purpose of locating an integral metal pad member as at 8. The pad members 8 cooperate when positioned outwardly against the seat backs or a seat back and the automobile dashboard to secure the bed against accidental displacement. In this regard attention is directed toward the concave seat contacting surfaces 8A of the pad members 8, which surfaces when firmly abutted against the seat or dashboard prevent any accidental upward dislodgement of the bed framework. A resilient lining may be used to deter injury to the contacted parts of the auto.

Each pin 7 is insertable as aforesaid through aligned openings 6 in the rods 5 which openings are spaced along each rod approximately at ½inch intervals to provide for maximum adjustability without weakening the rod itself. The pins are shown chained at 10 for the sake of convenience and also for the child's safety.

In FIG. 4 a fragment of an upper part of a front wall 11 of a bed enclosure is shown hingedly attached to the tubular end member 2 by means of a sleevelike terminus 12 along the top of the wall. The rear wall at 13 is identically formed at 14. The material used for the walls, including the bottom wall at 15 is of a semirigid, durable nature able to withstand calculated bending loads without shattering or breaking. For this reason a durable, high-impact-type plastic of attractive color is preferred.

With attention now being directed toward FIG. 1 and the mated edges of the end walls and bottom walls as therein typically shown. Said edges are respectively mortised in an alternate manner at 11A and 15A to permit interengagement of their edges and thereat to receive an interconnecting hinge element 16 extending transversely of the walls. To permit the collapsed configuration shown in FIG. 2 the mortises 11A and 15A are extended somewhat to allow the front and rear walls to move into the inclined relationship during collapsing. The mortising of rear and bottom wall edges is indicated at 13A and 15B which also receive a second hinge element 17.

For maintaining the bed in a useable configuration a sway brace 20 is shown pivoted at 21 to a side tubular member 1 its opposite end being notched at 22 (FIG. 2) to receive a pin 23 carried by front wall 11. Accordingly with the front wall secured in the vertical, the rear wall 13 is also maintained vertical in both operative dispositions shown in FIG. 1 and FIG. 5. A pin 24 is affixed to one of the side members 1 to receive the sway brace 20 when the bed is folded as in FIG. 2. The sleevelike terminus 12 and 14 of the front and rear walls will support the tubular end members 2 when the bed is placed on a flat surface as in FIG. 5. With the car disposed as in FIG. 1 the terminus 12 and 14 of course serve to suspend the walls.

Foldable sides of the car bed are provided by a fabric member which is stitched at 26 about the tubular side members 1 and from thence extends downwardly to constitute sidewalls 27. The fabric member may be of one piece, extending around beneath the bottom wall 14 when in place. If desired said fabric member may be secured to the bottom wall along the sides of the latter.

I claim:

1. A car bed for infants comprising in combination:
   a tubular framework of rectangular shape having rigid interconnected side and end members;
   front and rear pairs of support rods telescopically carried by said side members with said rods having apertures to receive locking means;
   locking means insertable into said framework and into said support rods;
   pad members affixed to the outer ends of said support rods and having concave surfaces for retentive abutment against front and rear automobile seats;
   front and rear end walls depending from said end members of the framework and an intermediate bottom wall hingedly suspended therebetween;
   said front and rear walls terminating upwardly in rigid sleeve portions extending about the framework end members in a manner permitting said walls to be swung upwardly along with the bottom wall to collapse same upwardly against said framework, and
   sidewalls for said bed being of foldable material and extending downwardly from said side members of the framework to define along with said end walls a bed enclosure.

2. The car bed as claimed in claim 7 wherein a sway brace is pivotally mounted at one of its ends to one of the framework side members and is adapted at its opposite end for engagement with one of the end walls for retaining the latter in a vertical operative position, said bottom wall and the remaining end wall also being retained in an operative position to support the framework when the car bed is disassociated from the automobile seat.